Apr. 24, 1923.

L. J. B. FOURNIAUD 1,452,832

RIM FOR WHEELS OF VEHICLES

Filed Aug. 24, 1921

INVENTOR
LÉON JEAN BAPTISTE FOURNIAUD
PER
HIS ATTORNEYS

Patented Apr. 24, 1923.

1,452,832

UNITED STATES PATENT OFFICE.

LÉON JEAN BAPTISTE FOURNIAUD, OF MARSEILLE, FRANCE.

RIM FOR WHEELS OF VEHICLES.

Application filed August 24, 1921. Serial No. 494,781.

(GRANTED UNDER THE PROVISIONS OF THE ACT OF MARCH 3, 1921, 41 STAT. L., 1313.)

*To all whom it may concern:*

Be it known that I, LÉON JEAN BAPTISTE FOURNIAUD, a citizen of the Republic of France, residing at Marseille, in the Republic of France, have invented certain new and useful Improvements in and Relating to Rims for Wheels of Vehicles (for which I have filed application in France, March 26, 1919, Patent No. 486,288/21,329 additional patent), of which the following is a specification.

This invention relates to tired rims of vehicle wheels which can be constructed and expanded in diameter to facilitate removal and replacement of a tire.

The chief object of the invention is to provide an improved rim of this kind in which the action of removing or re-assembling a removable flange of the rim produces simultaneous contraction or expansion of the diameter of the rim. Other objects of the invention will be hereinafter made evident.

The invention is more particularly intended to be applied to the expansible rim with segmented base ring described in my co-pending application for Letters Patent No. 494780, filed August 24, 1921.

The present invention consists broadly in providing connections between the segmented base ring and the bolt fastenings uniting the parts of the tire holding ring, whereby screwing and unscrewing the nuts of said bolts is attended by simultaneous expansion and contraction respectively of the base ring.

Figure 1:
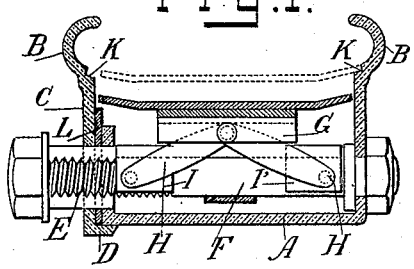
Figure 2:
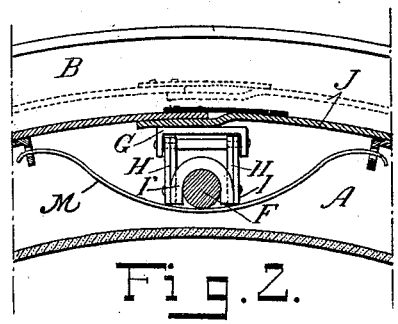
Figure 3:
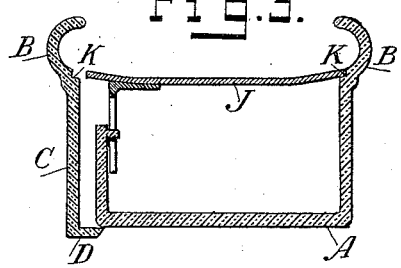
Figure 4:
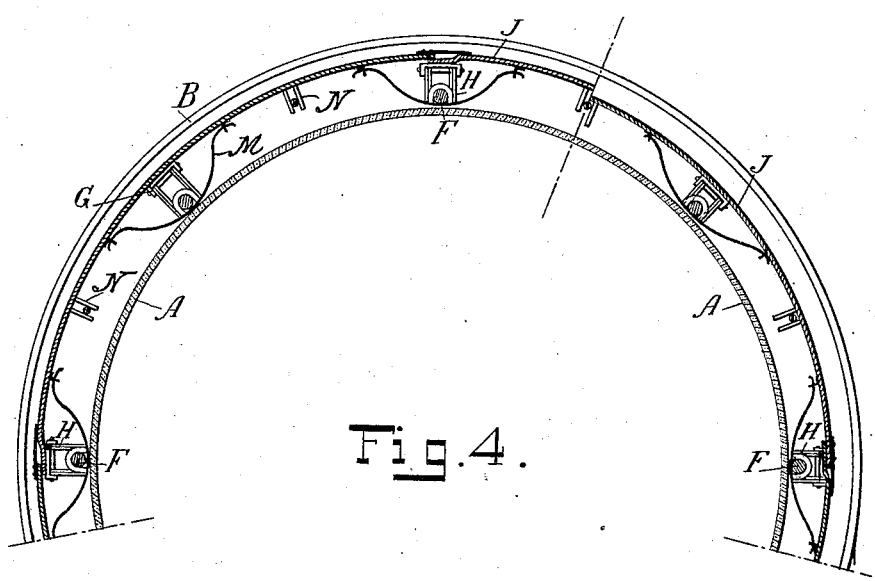

The invention is more particularly described by way of example with reference to the accompanying drawings in which, Figures 1 and 2 are vertical, transverse and longitudinal sections of a rim in accordance with the invention, Fig. 3 is a section of the three parts, forming the rim, the beaded flange, and the expansible base, Figure 4 shows the complete rim with the beaded flange dismounted, on a reduced scale.

The rim comprises a base ring J of variable diameter and a tire holding ring A with one integral tire holding flange with groove or bead B.

The other tire holding flange C is separate and has a similar groove B and also a small overlapping extension D. The ring B C D is fitted to the ring A B as shown in Figs. 1 and 3. Both rings are bored with for instance eight holes, for the insertion of eight connecting devices comprising nuts E with threaded shanks and bolts F.

Above each of these bolts there is a plate G of channel section mounted on four toggle links H. These links are pivoted at one end at the centre of the sides of the plate, and at the other end they are pivoted on two bridge pieces 1, so that when these bridge pieces approach one another the plate G is moved away from the centre of the wheel, whilst by separating said pieces the plate G is moved inwards towards this centre.

These eight plates G sustain the four circular overlapping segments which, as in the prior application referred to, form the expansible base ring J. The expansible base ring being in the position indicated in full lines in Figs. 1 and 2 and the flange C removed, a pneumatic tire can very easily be removed or put in place on the rim by hand, the diameter of the rim being reduced at this moment to even less than the normal diameter of the pneumatic tire and there being no beaded edge over which it has to pass. When the tire is put on, the flange C is replaced, being easily caused to register by providing two suitable guides engaging two notches, whereupon the eight nuts E are tightened up.

M denotes springs controlling the expansion of the segmented ring J. N denotes means for preventing relative rotation between the segments of ring J and the ring A, comprising projections on the segments engaging cross-pins fixed in the ring A.

The nuts E on being screwed up on their bolts F, force inwards the bridge pieces 1 whilst the opposite bridge pieces 1' abut against the fixed cheek of the ring A. Force is thereby transmitted through the links H to the plates G and the segments of the ring J, which returns said ring to its original normal operative diameter.

By screwing up completely the nuts E, the expansible base ring is held in place, and for additional solidity, its edges are adapted to engage small circular grooves K provided in the base of the tire holding grooves or beads B. A plastic metal washer L which may be fixed by a few rivets on the flange C enables a perfectly tight joint to be obtained and prevents the penetration of water and dust to the interior of the rim.

Shearing action between the flange C and the rim is absolutely avoided by the special construction of the nuts E, the shanks of which penetrate the interior of the rim, passing through both the flange C and the ring A. The addition to the flange C of the circular flange D which bears against the inner periphery of the ring A lends further solidity to the structure.

I claim:

1. A rim for tired wheels of vehicles comprising, a ring with means for holding one edge of a tire, a second ring with means for holding the other edge of the tire, a plurality of segments arranged with their ends overlapping to form a ring of variable diameter concentric to the tire holding rings, means for expanding and contracting the variable diameter ring, a plurality of bolts extending through the annular space between the ring of variable diameter and the tire holding rings, nuts for said bolts, the bolts and nuts being fastenings for uniting the two tire holding rings, and connections between the ring expanding means and the bolts and nuts whereby screwing and unscrewing of the latter causes expansion and contraction respectively of said ring.

2. A rim for tired wheels of vehicles comprising, a ring with means for holding one edge of a tire, a second ring with means for holding the other edge of the tire, a plurality of segments arranged with their ends overlapping to form a ring of variable diameter concentric to the tire holding rings, a plurality of plates of channel section abutting on the segments, a plurality of bolts extending through the annular space between the ring of variable diameter and the tire holding rings, nuts for said bolts, the bolts and nuts being fastenings for uniting the two tire holding rings, a plurality of bridge pieces straddling the bolts, and a set of toggle links jointed to each of said channel plates and to the bridge pieces on the corresponding bolts whereby screwing and unscrewing of the latter causes expansion and contraction respectively of said ring.

3. A rim for tired wheels of vehicles comprising, a channeled ring with its side flanges each equipped with a tire holding groove, one of the grooved parts being removable, and having an inturned flange engaging the inner periphery of the other ring part, an expansible base ring occupying the outer perimeter of the channel and consisting of a plurality of segments with overlapping ends, a plurality of plate springs arranged in the channel and tending to hold the base ring in contracted condition, a plurality of bolts traversing the channel and connecting the parts of the channeled ring, nuts for said bolts having shanks engaging both parts of the channeled ring, two groups of bridge pieces straddling the bolts, the pieces in one group abutting the bolt heads and those in the other group abutting the nuts, a plurality of channel section plates located between the bolts and the segments of the base ring, and a set of toggle links jointed to each of said channel plates and to the bridge pieces on the corresponding bolts, whereby screwing and unscrewing of the latter causes expansion and contraction respectively of said ring.

In testimony whereof I affix my signature in presence of two witnesses.

LÉON JEAN BAPTISTE FOURNIAUD.

Witnesses:
 EUGENE DUCAFFOLE,
 SAMUEL G. EBLING.